(12) United States Patent
Mathe et al.

(10) Patent No.: US 8,988,432 B2
(45) Date of Patent: Mar. 24, 2015

(54) SYSTEMS AND METHODS FOR PROCESSING AN IMAGE FOR TARGET TRACKING

(75) Inventors: Zsolt Mathe, Issaquah, WA (US); Charles Claudius Marais, Duvall, WA (US); Craig Peeper, Kirkland, WA (US); Joe Bertolami, Redmond, WA (US); Ryan Michael Geiss, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 510 days.

(21) Appl. No.: 12/613,105

(22) Filed: Nov. 5, 2009

(65) Prior Publication Data

US 2011/0102438 A1    May 5, 2011

(51) Int. Cl.
| | |
|---|---|
| *G06T 11/00* | (2006.01) |
| *G06T 11/40* | (2006.01) |
| *G06T 15/30* | (2011.01) |
| *G06T 7/00* | (2006.01) |
| *G06F 3/01* | (2006.01) |
| *A63F 13/20* | (2014.01) |

(Continued)

(52) U.S. Cl.
CPC ............... *G06F 3/017* (2013.01); *A63F 13/06* (2013.01); *A63F 13/10* (2013.01); *G06K 9/00201* (2013.01); *G06K 9/40* (2013.01); *A63F 2300/1093* (2013.01); *A63F 2300/6045* (2013.01)
USPC ........................................ 345/426; 345/619

(58) Field of Classification Search
CPC ......... G06T 11/00; G06T 15/30; G06T 11/40; G06T 7/0059; G06T 7/0075
USPC .................................................. 345/426, 619
See application file for complete search history.

(56) References Cited

U.S. PATENT DOCUMENTS

| | | | |
|---|---|---|---|
| 4,627,620 | A | 12/1986 | Yang |
| 4,630,910 | A | 12/1986 | Ross et al. |

(Continued)

FOREIGN PATENT DOCUMENTS

| | | |
|---|---|---|
| CN | 1989770 A | 6/2007 |
| CN | 201254344 B | 6/2010 |

(Continued)

OTHER PUBLICATIONS

Skocaj et al., "Robust Recognition and Pose Determination of 3-D Objects Using Range Images in Eigenspace Approach", Jun. 1, 2001, 3-D Digital Imaging and Modeling, pp. 171-178.*

(Continued)

*Primary Examiner* — Xiao M. Wu
*Assistant Examiner* — Matthew D Salvucci
(74) *Attorney, Agent, or Firm* — Gregg Wisdom; Judy Yee; Micky Minhas

(57) ABSTRACT

An image such as a depth image of a scene may be received, observed, or captured by a device. The image may then be processed. For example, the image may be downsampled, a shadow, noise, and/or a missing potion in the image may be determined, pixels in the image that may be outside a range defined by a capture device associated with the image may be determined, a portion of the image associated with a floor may be detected. Additionally, a target in the image may be determined and scanned. A refined image may then be rendered based on the processed image. The refined image may then be processed to, for example, track a user.

14 Claims, 11 Drawing Sheets

(51) Int. Cl.
  *A63F 13/40* (2014.01)
  *G06K 9/00* (2006.01)
  *G06K 9/40* (2006.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,167,578 B2 | 1/2007 | Blake et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |

(56) References Cited

U.S. PATENT DOCUMENTS

| | | | |
|---|---|---|---|
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2004/0179729 A1* | 9/2004 | Imai et al. ............ 382/154 |
| 2007/0024635 A1 | 2/2007 | Jojic et al. |
| 2007/0127778 A1* | 6/2007 | Fujimoto ............ 382/104 |
| 2008/0026838 A1 | 1/2008 | Dunstan et al. |
| 2008/0152191 A1 | 6/2008 | Fujimura et al. |
| 2008/0212836 A1 | 9/2008 | Fujimura et al. |
| 2009/0141933 A1 | 6/2009 | Wagg |
| 2009/0175540 A1 | 7/2009 | Dariush et al. |
| 2009/0221368 A1 | 9/2009 | Yen et al. |

FOREIGN PATENT DOCUMENTS

| | | |
|---|---|---|
| EP | 0583061 A2 | 2/1994 |
| EP | 2071515 A1 | 6/2009 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | WO 2009/059065 A1 | 5/2009 |

OTHER PUBLICATIONS

Wang et al., "Using Human Body Gestures As Inputs for Gaming Via Depth Analysis", Apr. 26, 2008, Multimedia and Expo, 2008 IEEE International Conference, pp. 993-996.*
Felzenszwalb et al., "Efficient Graph-Based Image Segmentation", Sep. 2004, International Journal of Computer Vision, vol. 59, No. 2, pp. 167-181.*
Alam et al., "Improved Multiple Target Tracking via Global Motion Compensation and Optoelectronic Correlation", IEEE Transactions on Industrial Electronics, Feb. 2007, 54(1), 522-529.
Barsamian et al., "Target Tracking and Localization Using Infrared Video Imagery", Proceedings of the SPIE Defense and Security Symposium, Apr. 2006, 6231, 7 pages.
Cai et al., "Tracking Human Motion Using Multiple Cameras", Proceedings of the 13th International Conference on Pattern Recognition, Vienna, Austria, Aug. 25-29, 1996, 3, 5 pages.
Lim et al., "Dynamic Appearance Modeling for Human Tracking", 2006 IEEE Computer Society Conference on Computer Vision and Pattern Recognition, Jun. 17-22, 2006, 7 pages.
Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.
Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.
Rosenhahn et al., "Automatic Human Model Generation", 2005, pp. 41-48, University of Auckland (CITR), New Zealand.
Aggarwal et al., "Human Motion Analysis: A Review", IEEE Nonrigid and Articulated Motion Workshop, 1997, University of Texas at Austin, Austin, TX.
Shao et al., "An Open System Architecture for a Multimedia and Multimodal User Interface", Aug. 24, 1998, Japanese Society for Rehabilitation of Persons with Disabilities (JSRPD), Japan.
Kohler, "Special Topics of Gesture Recognition Applied in Intelligent Home Environments", In Proceedings of the Gesture Workshop, 1998, pp. 285-296, Germany.
Kohler, "Vision Based Remote Control in Intelligent Home Environments", University of Erlangen-Nuremberg/Germany, 1996, pp. 147-154, Germany.
Kohler, "Technical Details and Ergonomical Aspects of Gesture Recognition applied in Intelligent Home Environments", 1997, Germany.
Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.
Qian et al., "A Gesture-Driven Multimodal Interactive Dance System", Jun. 2004, pp. 1579-1582, IEEE International Conference on Multimedia and Expo (ICME), Taipei, Taiwan.
Zhao, "Dressed Human Modeling, Detection, and Parts Localization", 2001, The Robotics Institute, Carnegie Mellon University, Pittsburgh, PA.
He, "Generation of Human Body Models", Apr. 2005, University of Auckland, New Zealand.
Isard et al., "Condensation—Conditional Density Propagation for Visual Tracking", 1998, pp. 5-28, International Journal of Computer Vision 29(1), Netherlands.
Livingston, "Vision-based Tracking with Dynamic Structured Light for Video See-through Augmented Reality", 1998, University of North Carolina at Chapel Hill, North Carolina, USA.
Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.
Breen et al., "Interactive Occlusion and Collusion of Real and Virtual Objects in Augmented Reality", Technical Report ECRC-95-02, 1995, European Computer-Industry Research Center GmbH, Munich, Germany.
Freeman et al., "Television Control by Hand Gestures", Dec. 1994, Mitsubishi Electric Research Laboratories, TR94-24, Caimbridge, MA.
Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.
Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.
Azarbayejani et al., "Visually Controlled Graphics", Jun. 1993, vol. 15, No. 6, IEEE Transactions on Pattern Analysis and Machine Intelligence.
Granieri et al., "Simulating Humans in VR", The British Computer Society, Oct. 1994, Academic Press.
Brogan et al., "Dynamically Simulated Characters in Virtual Environments", Sep./Oct. 1998, pp. 2-13, vol. 18, Issue 5, IEEE Computer Graphics and Applications.
Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.

* cited by examiner

SYSTEMS AND METHODS FOR PROCESSING AN IMAGE FOR TARGET TRACKING

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than, or abstracted from, actual game actions or other application actions for which the controls are used. For example, a game control that causes a game character to swing a baseball bat may not correspond to an actual motion of swinging the baseball bat.

SUMMARY

Disclosed herein are systems and methods for processing an image of a scene that may be used to track one or more users in a scene. For example, an image such as a depth image of a scene may be received or observed. The image may then be processed. For example, the image may be downsampled, a shadow, noise, and/or a missing potion in the image may be determined and/or values associated therewith may be estimated, pixels in the image that may be outside a range defined by a capture device associated with the image may be determined, and/or a portion of the image associated with a planar surface such as a floor, a wall, or the like may be detected. Additionally, the image may be analyzed to determine whether a target may be included therein and, based on the determination, the target may be scanned. The image may also be processed by, for example, segmenting the target from an environment such as non-target objects in the image such that a mask such as a binary mask of the target may be created and one or more pixels associated with the environment may be removed or discarded.

A refined image may also be rendered based on the processed image. According to one embodiment, the refined image may be the image with noise, missing portions, shadows, or the like removed and/or smoothed, the target isolated, the planar surface such as the floor, wall, or the like identified, or any other suitable processing performed thereon.

In one embodiment, the refined image and/or the mask such as a binary mask associated with the target may then be processed. For example, the target recognition, analysis, and tracking system may process the refined image and/or the binary mask associated with the target such that a model such as a skeletal model, a mesh model, or the like of the target in the captured scene may be generated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION OF ILLUSTRATIVE EMBODIMENTS

Figure 1A:
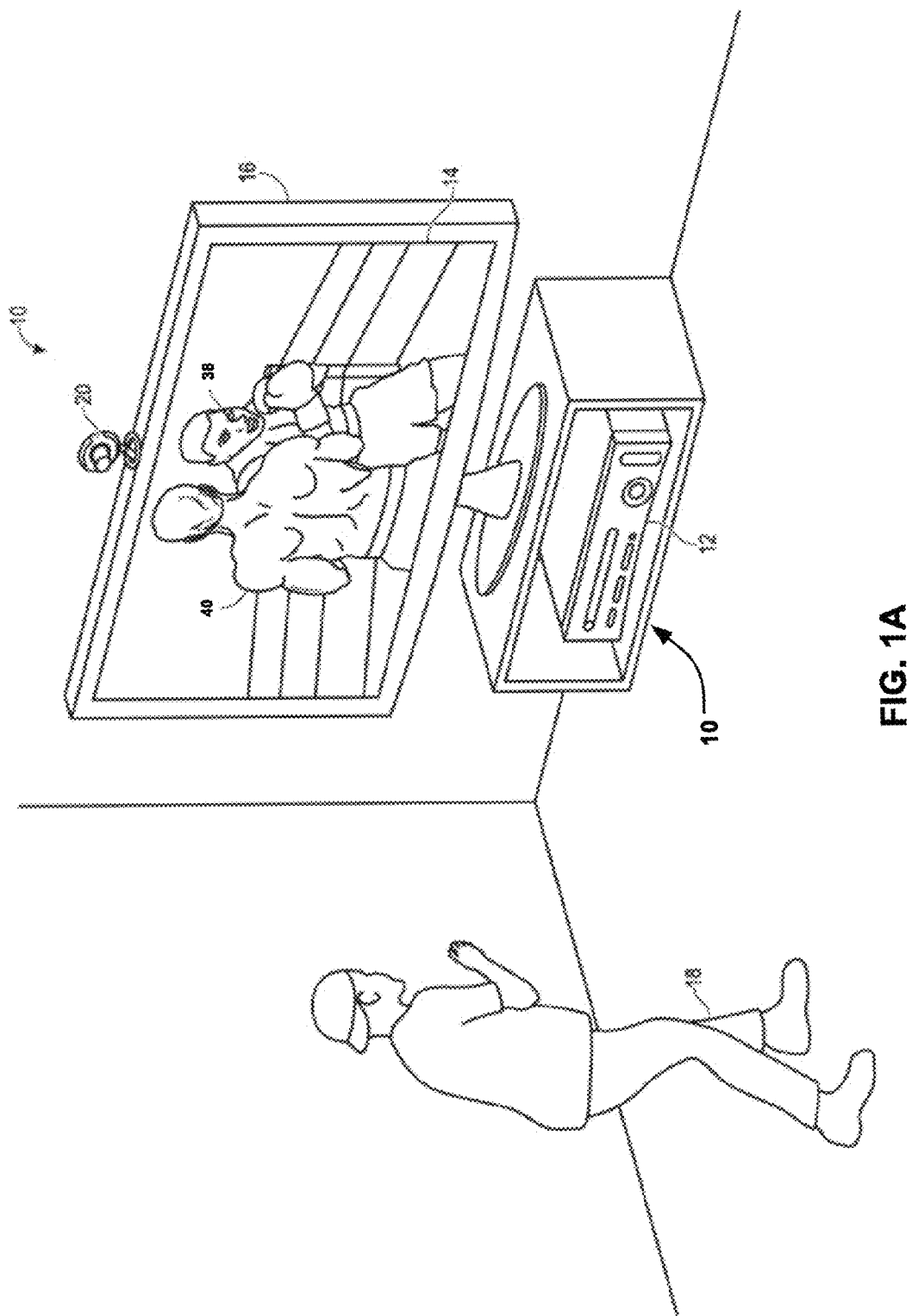
FIGS. 1A and 1B illustrate an example embodiment of a target recognition, analysis, and tracking system with a user playing a game.
Figure 1B:
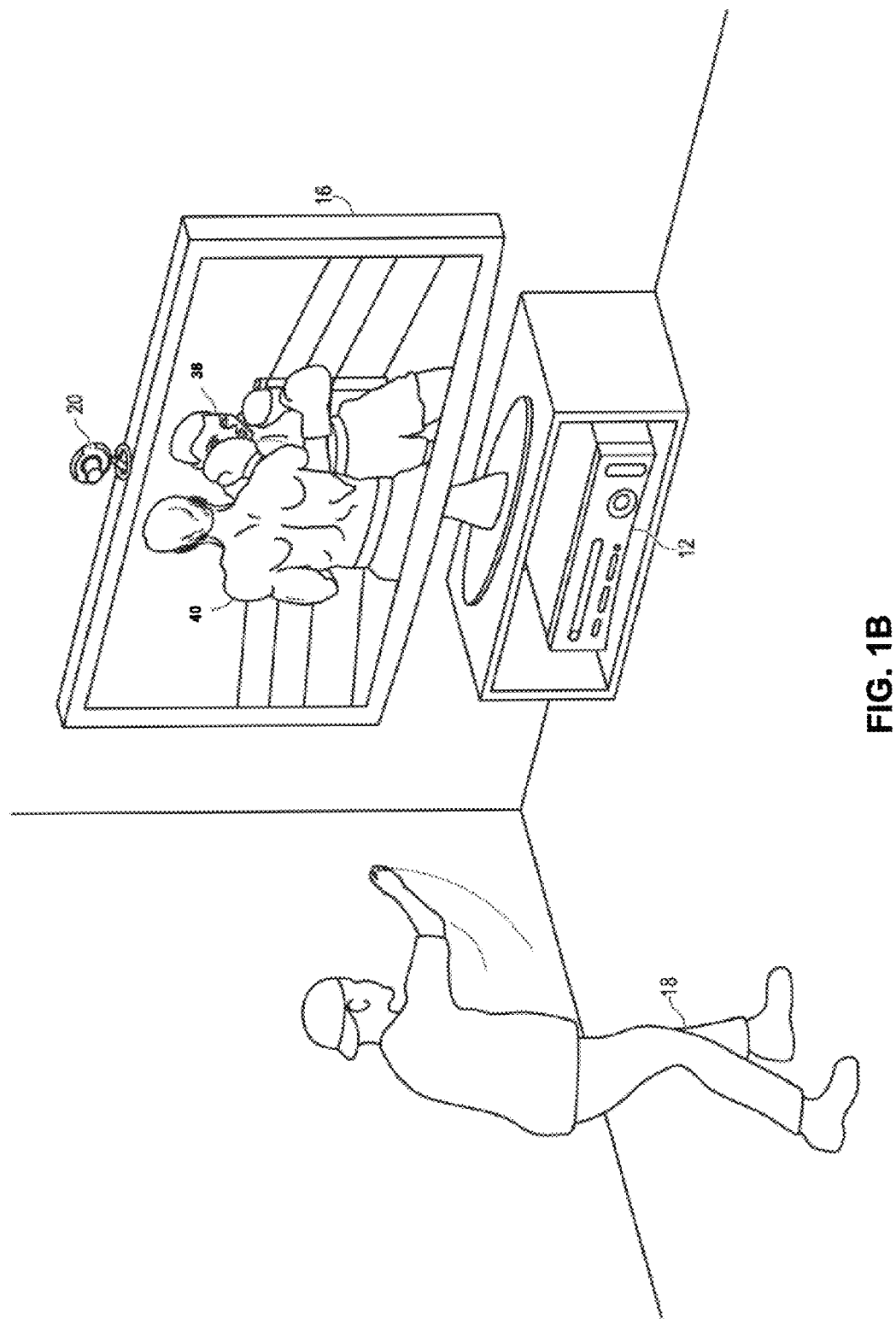

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like. In one embodiment, the computing environment 12 may include a processor such as a standardized processor, a specialized processor, a microprocessor, or the like that may execute instructions including, for example, instructions for receiving an image, processing the image to determine one or more characteristics of the scene, rendering a refined image based the one or more characteristics of the scene, or any other suitable instruction, which will be described in more detail below.

As shown in FIG. 1A, the target recognition, analysis, and tracking system 10 may further include a capture device 20. The capture device 20 may be, for example, a camera that may be used to visually monitor one or more users, such as the user 18, such that gestures and/or movements performed by the one or more users may be captured, analyzed, and tracked to perform one or more controls or actions within an application and/or animate an avatar or on-screen character, as will be described in more detail below.

According to one embodiment, the target recognition, analysis, and tracking system 10 may be connected to an audiovisual device 16 such as a television, a monitor, a highdefinition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the gestures and/or movements of user 18 may be captured to animate an avatar or on-screen character and/or may be interpreted as controls that may be used to affect the application being executed by computer environment 12. Thus, according to one embodiment, the user 18 may move his or her body to control the application and/or animate the avatar or on-screen character.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 38 to the user 18. The computing environment 12 may also use the audiovisual device 16 to provide a visual representation of a player avatar 40 that the user 18 may control with his or her movements. For example, as shown in FIG. 1B, the user 18 may throw a punch in physical space to cause the player avatar 40 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 40 in game space and/or the motion of the punch may be used to animate the player avatar 40 in game space.

Other movements by the user 18 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 40. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
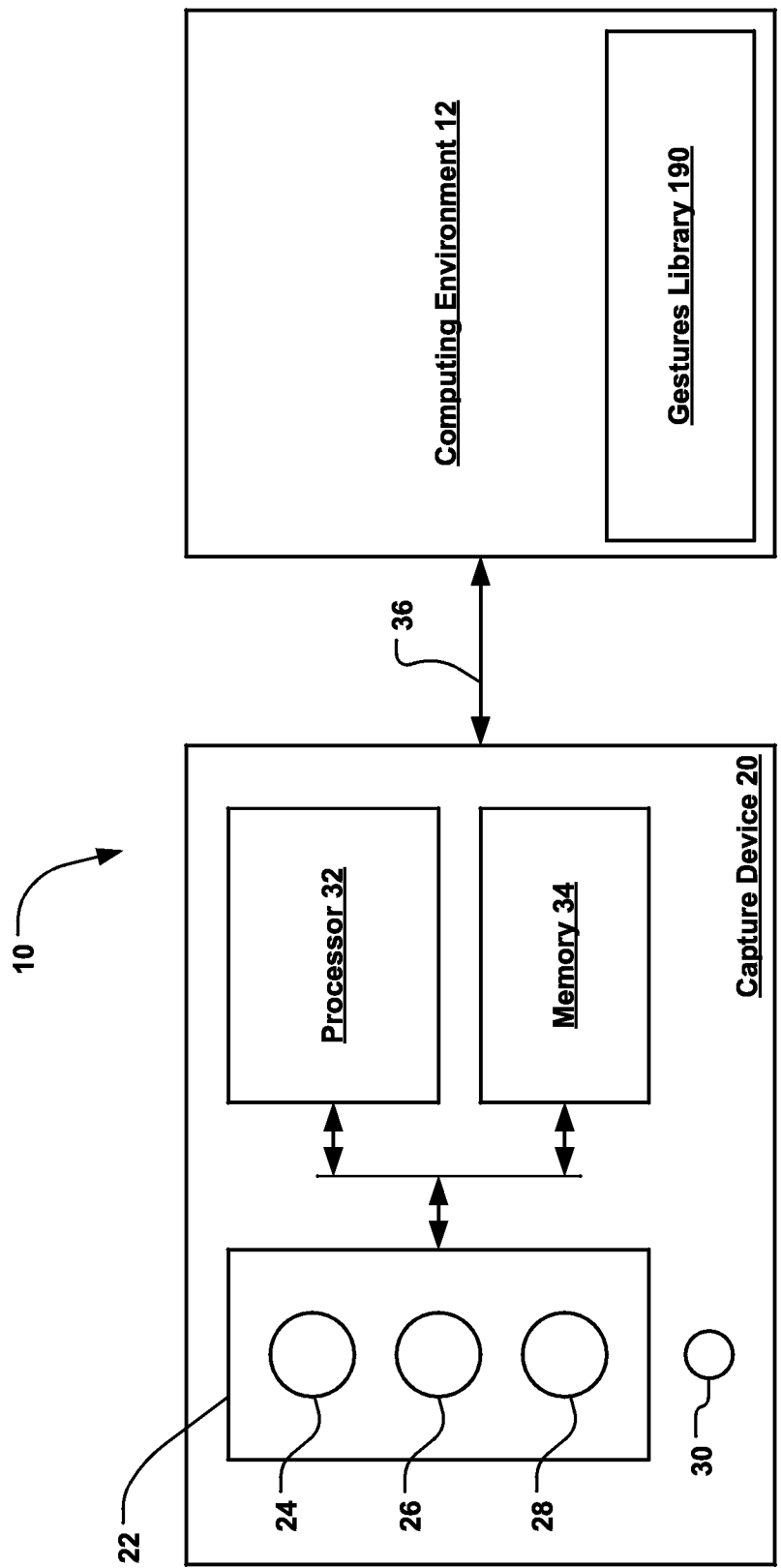
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions including, for example, instructions for receiving an image, processing the image to determine one or more characteristics of the scene, rendering a refined image based the one or more characteristics of the scene, or any other suitable instruction, which will be described in more detail below.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and/or a skeletal model that may be generated by the capture device 20 to the computing environment 12 via the communication link 36. The computing environment 12 may then use the model, depth information, and captured images to, for example, control an application such as a game or word processor and/or animate an avatar or on-screen character. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 28 and the capture device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and to control an application based on the movements.

Figure 3:
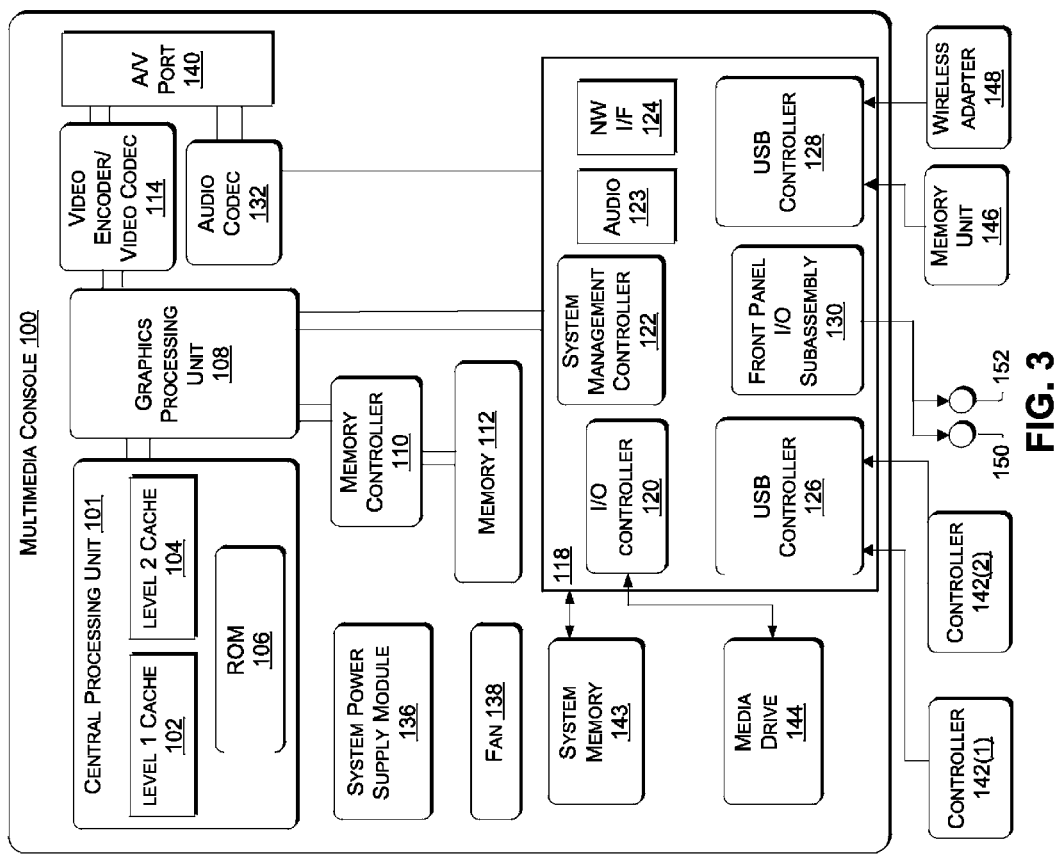
FIG. 3 illustrates an example embodiment of a computing environment that may be used to interpret one or more gestures in a target recognition, analysis, and tracking system and/or animate an avatar or on-screen character displayed by a target recognition, analysis, and tracking system.

FIG. 3 illustrates an example embodiment of a computing environment that may be used to interpret one or more gestures in a target recognition, analysis, and tracking system and/or animate an avatar or on-screen character displayed by the target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 4:
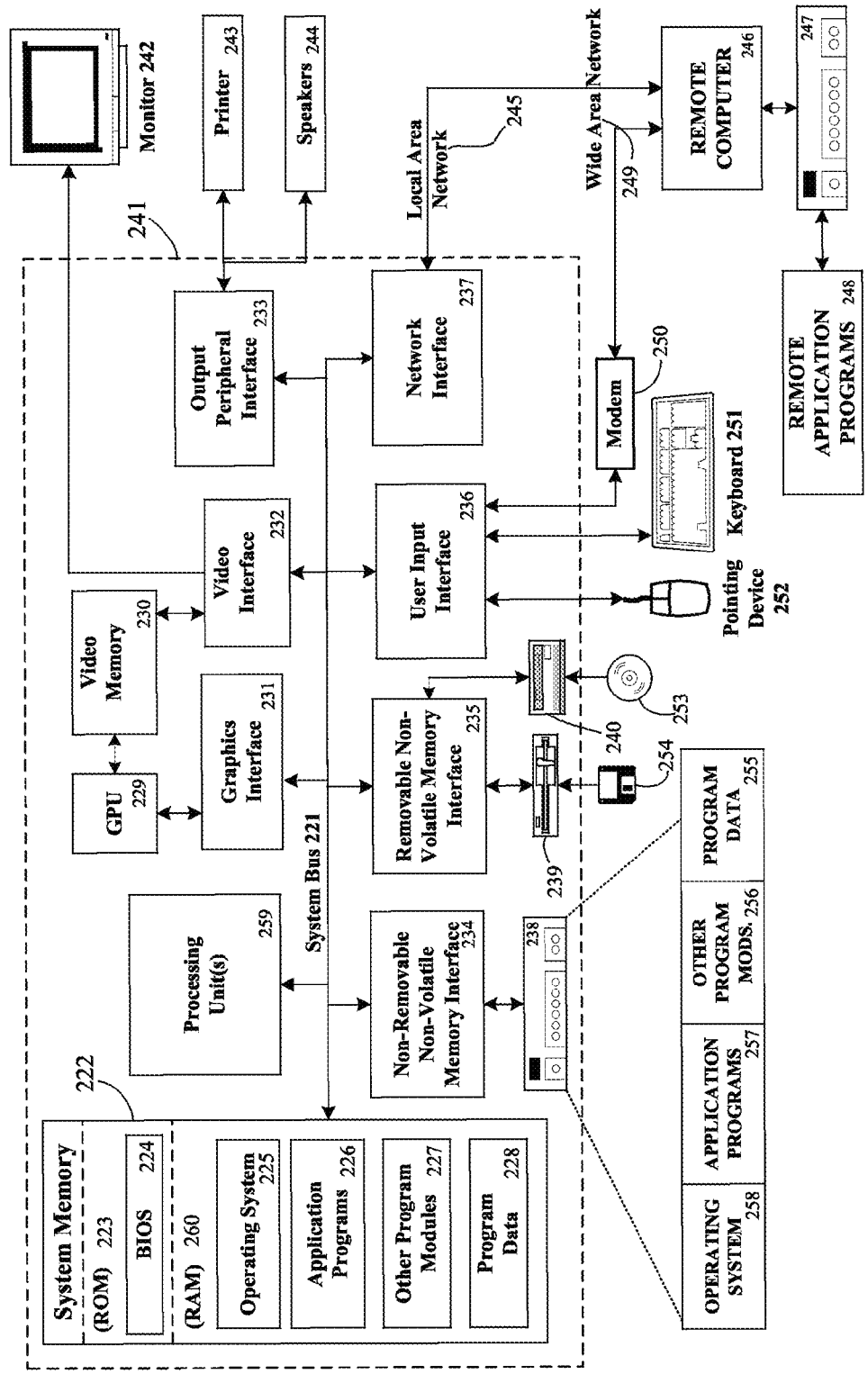
FIG. 4 illustrates another example embodiment of a computing environment that may be used to interpret one or more gestures in a target recognition, analysis, and tracking system and/or animate an avatar or on-screen character displayed by a target recognition, analysis, and tracking system.

FIG. 4 illustrates another example embodiment of a computing environment 220 that may be the computing environment 12 shown in FIGS. 1A-2 used to interpret one or more gestures in a target recognition, analysis, and tracking system and/or animate an avatar or on-screen character displayed by a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
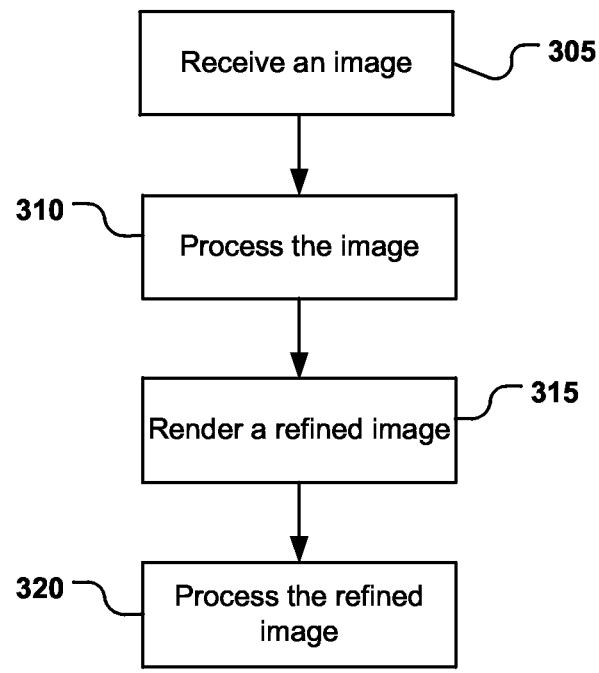
FIG. 5 depicts a flow diagram of an example method for processing an image of a scene to track a target that may be included in the scene.

FIG. 5 depicts a flow diagram of an example method 300 for processing an image of a scene to track a user that may be in the scene. The example method 300 may be implemented using, for example, the capture device 20 and/or the computing environment 12 of the target recognition, analysis, and tracking system 10 described with respect to FIGS. 1A-4. In an example embodiment, the example method 300 may take the form of program code (i.e., instructions) that may be executed by, for example, the capture device 20 and/or the computing environment 12 of the target recognition, analysis, and tracking system 10 described with respect to FIGS. 1A-4.

According to one embodiment, at 305, an image such as a depth image, an RGB image, an IR image, or the like may be received. For example, the target recognition, analysis, and tracking system may include a capture device such as the capture device 20 described above with respect to FIGS. 1A-2. The capture device may capture or observe a scene that may include one or more targets. In an example embodiment, the capture device may be a depth camera configured to obtain an image such as a depth image, an RGB image, an IR image, or the like of the scene using any suitable technique such as time-of-flight analysis, structured light analysis, stereo vision analysis, or the like.

In one embodiment, the image may include a plurality of observed pixels where each observed pixel has an observed depth value, RGB information, depth information, or the like. For example, the image may be a depth image that include a two-dimensional (2-D) pixel area of the captured scene where each pixel in the 2-D pixel area may have a depth value such as a length or distance in, for example, centimeters, millimeters, or the like of an object in the captured scene from the capture device.

Figure 6:
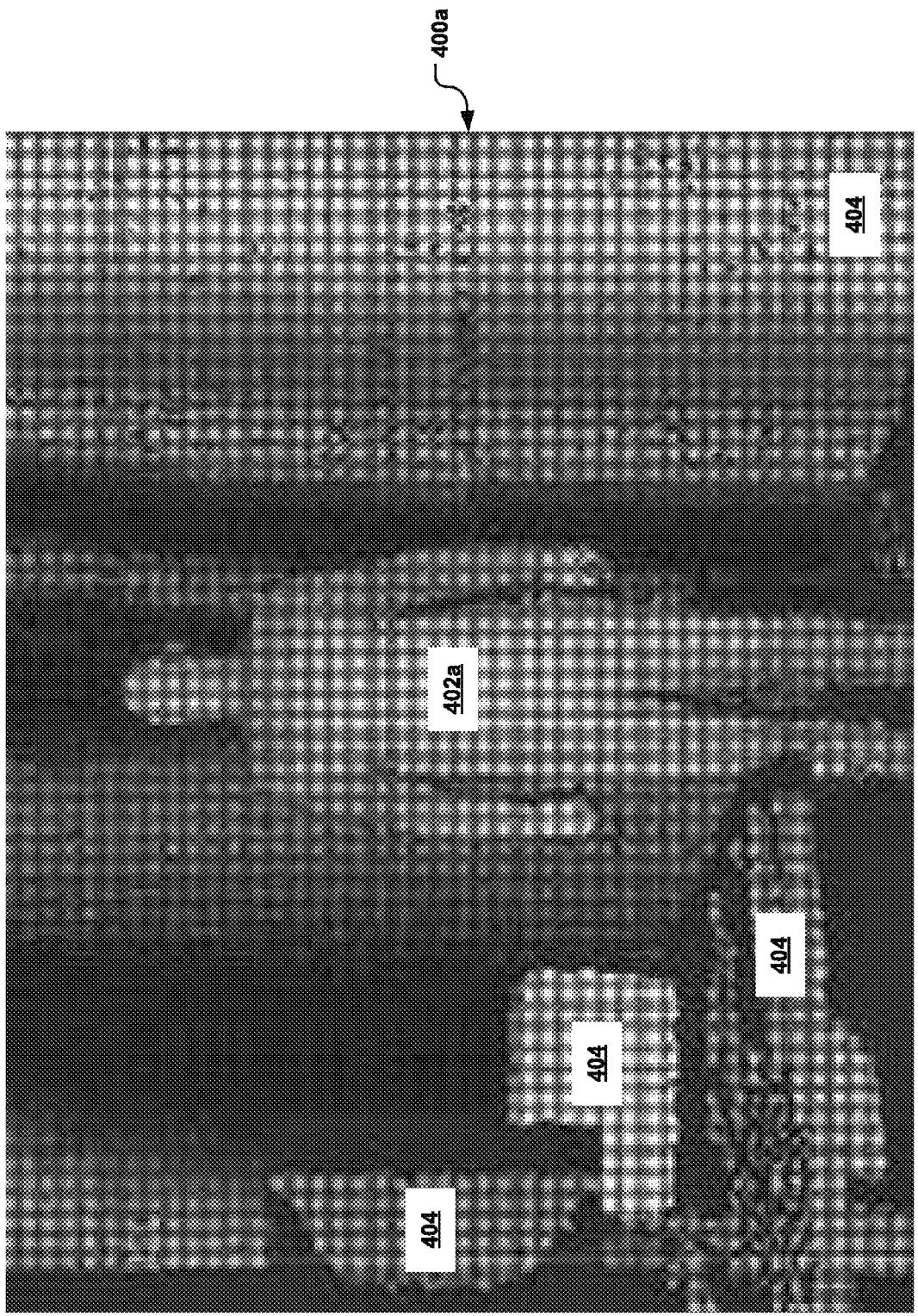
FIG. 6 illustrates an example embodiment of a depth image that may be captured or observed.

FIG. 6 illustrates an example embodiment of a depth image 400a that may be received at 305. According to an example embodiment, the depth image 400a may be an image or frame of a scene captured by, for example, the 3-D camera 26 and/or the RGB camera 28 of the capture device 20 described above with respect to FIG. 2. As shown in FIG. 6, the depth image 400a may include a human target 402a corresponding to, for example, a user such as the user 18 described above with respect to FIGS. 1A and 1B and one or more non-human targets 404 such as a wall, a table, a monitor, or the like in the captured scene. As described above, the depth image 400a may include a plurality of observed pixels where each observed pixel has an observed depth value associated therewith. For example, the depth image 400*a* may include a two-dimensional (2-D) pixel area of the captured scene where each pixel at particular X-value and Y-value in the 2-D pixel area may have a depth value such as a length or distance in, for example, centimeters, millimeters, or the like of a target or object in the captured scene from the capture device.

In one embodiment, the depth image 400*a* may be colorized such that different colors of the pixels of the depth image correspond to and/or visually depict different distances of the human target 402*a* and non-human targets 404 from the capture device. For example, the pixels associated with a target closest to the capture device may be colored with shades of red and/or orange in the depth image whereas the pixels associated with a target further away may be colored with shades of green and/or blue in the depth image.

Referring back to FIG. 5, at 310, the image may be processed. According to one embodiment, the target recognition, analysis, and tracking system may process the image such that one or more characteristics of the scene associated with the captured image may be determined and/or refined. For example, the image may be downsampled; shadows or obstructed areas may be estimated; out of range information such as depth values may be detected; one or more high-variance and/or noisy portions of the image may be removed and/or smoothed; portions of missing and/or removed information such as depth values of the image may be filled in and/or reconstructed; portions of the image that include a planar surface such as a floor, a wall, or the like may be detected; a target may be identified, scanned, and isolated from the image; and/or any other suitable processing may be performed on the received depth image, which will be described in more detail below.

Figure 7:
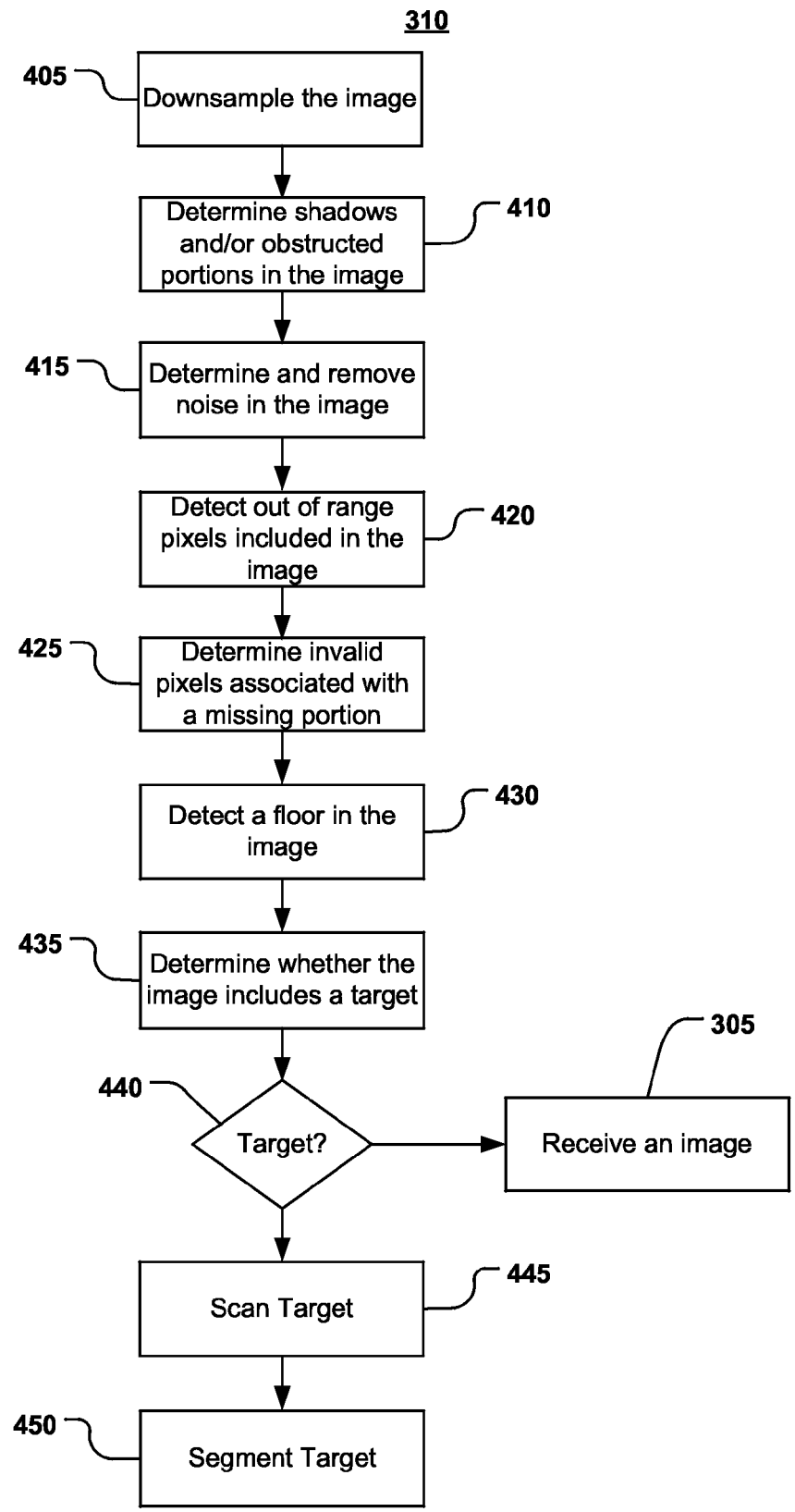
FIG. 7 depicts a flow diagram of an example method for processing an image of a scene to track a target that may be included in the scene.

FIG. 7 depicts a flow diagram of an example method for processing an image at 310 shown in FIG. 5. For example, as shown in FIG. 5, after receiving an image at 305, the image may be processed at 310. To process the image at 310, the image may be downsampled at 405 as shown in FIG. 7. For example, the target recognition, analysis, and tracking system may downsample the received image such that a size of the image including the number of pixels associated therewith may be reduced and a portion of invalid pixels such as pixels with a zero depth value, pixels previously identified as being invalid by one or more processing techniques described herein at 310, or the like may be filtered and removed from the image. For example, as described above, the image may be a depth image that may include a 2-D pixel area of the captured scene where each pixel may have an X-value, a Y-value, and a depth value (or Z-value) associated therewith. In one embodiment, the depth image may be downsampled by reducing the pixels in the 2-D pixel area into a smaller number of pixels. For example, the target recognition, analysis, and tracking system may select a downsampling kernel such a block of pixels including a 2×2 block of pixels, a 4×4 block of pixels, or the like that may be combined to downsample the image.

The target recognition, analysis, and tracking system may then scan the image using the downsampling kernel such that depth image may be divided into portions or blocks associated with the downsampling kernel. Each portion or block may then be processed to generate a downsampled kernel pixel for the depth image that may represent each portion or block. For example, in one embodiment, the target recognition, analysis, and tracking system may analyze each pixel in the portion or block associated with the downsampling kernel. Based on the analysis, the target recognition, analysis, and tracking system may generate one or more values such as X-values, Y-values, or depth values for the downsampled kernel pixel. For example, the target recognition, analysis, and tracking system may generate a depth value of the downsampled kernel pixel based on depth values associated with the valid pixels included in the portion or block associated with the downsampling kernel. According to example embodiments, the depth value generated for the downsampled kernel pixel may include a minimum depth value of the valid pixels or the pixels that may have a valid, non-zero depth value in the portion or block, a maximum depth value of the valid pixels in the portion or block, a mode of the depth values of the valid pixels in the portion or block, a median of the depth values of the valid pixels in the portion or block, or any other suitable depth value based on the depth values of the valid pixels in the portion or block. According to one embodiment, if each pixel in the portion or block associated with the downsampling kernel may be invalid or may have invalid depth values such as a depth value of zero, the target recognition, analysis, and tracking system may assign an invalid depth value such a depth value of zero to the downsampled kernel pixel being generated for the portion or block.

Thus, according to an example embodiment, at 405, the target recognition, analysis, and tracking system may downsample the image such that the number of pixels in the image may be reduced and a portion of the invalid pixels may be filtered and removed from the image based on the valid pixels included in the portion or block of pixels associated a downsampling kernel.

At 410, shadows and/or obstructed portions that may be in the received image may be estimated. For example, at 410, the target recognition, analysis, and tracking system may identify invalid pixels in the image that may be associated with a shadow such as an infrared shadow, a stereo shadow, or the like or an obstruction. To identify invalid pixels that may be associated with a shadow or an obstruction, the target recognition, analysis, and tracking system may scan the image horizontally in a left to right or right to left direction starting from, for example, the top or bottom of the image to identify or find invalid pixels in the image. According to an example embodiment, if a range or a group of invalid pixels may be indentified from the scan, the target recognition, analysis, and tracking system may determine a distance or area such as an X-distance that may be defined by the invalid pixels based on a first valid pixel that may be adjacent to a first invalid pixel at a beginning of the range or group of invalid pixels, a second valid pixel that may be adjacent to a second invalid pixel at an end of the range or group of invalid pixels, or the like. The target recognition, analysis, and tracking system may then determine a farthest depth value from the capture device and a closest depth value to the capture based on, for example, the first valid pixel and the second valid pixel that may define the beginning and ending of the range or group of invalid pixels. The target recognition, analysis, and tracking system may also determine the number of pixels between the first and second valid pixels and a distance from the capture device based on the farthest and closest depth values. According to an example embodiment, if the number of pixels between the first and second valid pixels at the distance determined from the farthest and closest depth values matches a predetermined number of pixels, which may be dependent on a function of depth based on neighboring valid pixels, physical lens, and/or IR emitter offsets of the capture device, for a shadow or an obstruction at that same distance stored in, for example, the target recognition, analysis, and tracking system, the range or group of invalid pixels may be identified as a shadow or an obstruction by the target recognition, analysis, and tracking system.

Thus, according to one embodiment, the target recognition, analysis, tracking system may identify an area of invalid pixels and an approximate distance of the area from the capture device. The target recognition, analysis, and tracking system may then compare the number of pixels in the area with a predetermined number of pixels for a shadow or an obstruction at the approximate distance. In an example embodiment, if the number of pixels in the area matches the predetermined number of pixels for a shadow or an obstruction at the approximate distance of the area from the capture device, the target recognition, analysis, and tracking system may identify the area as a shadow or an obstruction.

Figure 8:
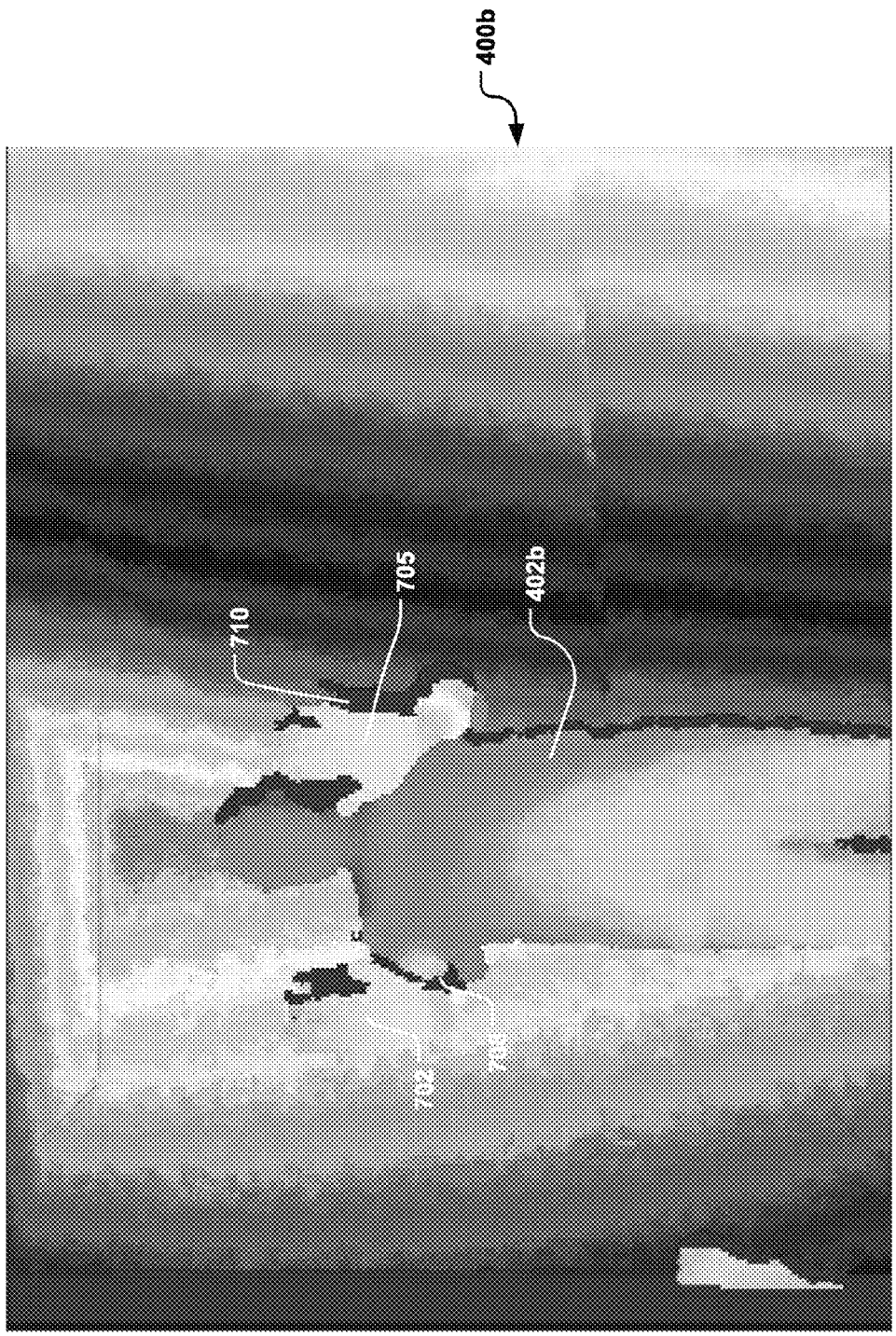
FIG. 8 illustrates an example embodiment of a depth image that may include an infrared shadow.

FIG. 8 illustrates an example embodiment of a depth image 400b that may include an infrared shadow. The depth image 400b may include a human target 402b associated with, for example, the user 18 described above with respect to FIGS. 1A and 1B. As shown in FIG. 8, a right hand 702 and a left hand 705 may be extended in front of a portion of the human target 402b.

According to an example embodiment, the right hand 702 and the left hand 705 that may be extended in front of a portion of the human target 402b may generate respective first and second infrared shadows 708 and 710. The first and second infrared shadows 708 and 710 may include portions of the depth image 700 observed or captured by a capture device such as the capture device 20 described above with respect to FIGS. 1A-2 where a body part may cast a shadow on the scene. According to an example embodiment, the capture device may observe or capture an invalid depth value such as a depth value of zero for the pixels associated with the portions in the depth image where a body part may cast a shadow on the scene.

Referring back to FIG. 7, at 410, after determining an invalid pixel may be associated with a shadow or an obstruction, values such as depth values of the pixels associated with a shadow such as the infrared shadow 708 or an obstructed area may be replaced or filled in. For example, the target recognition, analysis, and tracking system may estimate one or more values such as depth values for the shadow or obstructed area that may replace the invalid or missing values for the invalid pixels associated with the shadow or obstructed area in the received image.

According to one embodiment, the value for an invalid pixel associated with the shadow or obstructed area may be estimated based on neighboring valid pixels. For example, if one or more pixels adjacent to an invalid pixel associated with a shadow or obstructed area may have a valid depth value, the depth value for the invalid pixels associated with the shadow or obstructed area may be generated based on the valid depth values of the adjacent pixels. Thus, in one embodiment, the target recognition, analysis, and tracking system may estimate or interpolate valid depth values of pixels adjacent to the invalid pixels associated with the shadow or obstructed area. The target recognition, analysis, and tracking system may also assign the invalid pixels associated with the shadow or obstructed area a depth value of one of the adjacent pixels that may have a valid depth value.

According to one embodiment, the target recognition, analysis, and tracking system may identify and calculate depth values for each invalid pixel associated with a shadow or obstructed area until each of the invalid pixels may have a depth value associated therewith. Additionally, in another example embodiment, the target recognition, analysis, and tracking system may not interpolate a value for the invalid pixels associated with the shadow or obstructed area or may interpolate a value for part of or a portion of the invalid pixels associated with the shadow or obstructed area. For example, the shadow or obstructed area may include a first number of invalid pixels. If the first number of invalid pixels may be greater than a predetermined threshold of invalid pixels, the target recognition, analysis, and tracking system may determine that the shadow or obstructed are may include too many pixels to properly interpolate or estimate depth values for each of the invalid pixels based on neighboring or adjacent pixels that may have a valid depth value. Based on the determination, the target recognition, analysis, and tracking system may not estimate or interpolate values for the invalid pixels or the target recognition, analysis, and tracking system may estimate or interpolate values for only a portion of the invalid pixels.

Additionally, in another example embodiment, the target recognition, analysis, and tracking system may calculate depth values for one or more invalid pixels associated with a shadow or an obstructed area based on the depth image of a previous frame. As described above, the capture device such as the capture device 20 described above with respect to FIGS. 1A-2 may capture a scene in frames. Each frame may include a depth image. For example, the target, recognition, analysis, and tracking system may determine whether the corresponding pixel of a previous frame has a valid depth value. Based on the determination, the target, recognition, analysis, and tracking system may replace the depth value of the invalid pixel in present depth image with the depth value of the corresponding pixel of the previous frame.

In an example embodiment, noise in the image may be determined and removed from the image at 415. For example, the image received at 305 may include noise such as blurred edges around one or more objects in the image. The noise such as the blurred edges may be associated with pixels in the image that may have one or more values such as depth values that may not represent one or more objects in the scene accurately. For example, as described above, the image may include a human target and a wall. The arm of the human target may include pixels that may have depth values at approximately 1 meter whereas the wall may have depth values at approximately 2 meters. In one embodiment, the pixels at an edge of the arm may include noise or may be blurred such that the pixels may have a depth value of, for example, 1.5 meters or any other suitable value between the depth values of the arm and the wall.

At 415, the target recognition, analysis, and tracking system may determine the noise and may smooth the blurred values such as blurred depth values of such pixels to remove the noise in the image. According to one embodiment, to smooth blurred values associated with noise, the target recognition, analysis, and tracking system may select a noise window kernel. The noise kernel window may include a block of pixels including a 3×3 block of pixels, a 5×5 block of pixels, or the like. According to one embodiment, the target recognition, analysis, and tracking system may then analyze pixels in the image based on the noise window kernel. For example, the target recognition, analysis, and tracking system may select sets of pixels starting at, for example, a top left hand corner, a top right hand corner, a bottom left hand corner, a bottom right hand corner, or the like of the image based on the noise kernel. The target recognition, analysis, and tracking system may then analyze the pixels in each of the sets of pixels to determine whether the pixels may include noise.

For example, the sets of pixels may include 3×3 blocks of pixels based on the noise kernel window. The target recognition, analysis, and tracking system may then determine a noise variance of a middle pixel in each of the 3×3 blocks based on valid pixels adjacent to the middle pixel in the 3×3 block. According to one embodiment, the noise variance may include a difference between, for example, a depth value of the middle pixel and the depth values of each of the valid pixels adjacent to the middle pixel. If the noise variance may be greater than a predetermined noise variance threshold and less than a maximum variance threshold, the target recognition, analysis, and tracking system may determine the depth value of the middle pixel may be blurry. The target recognition, analysis, and tracking system may then replace the depth value of the middle pixel that may be blurry with an average depth value calculated based on the pixels adjacent to the middle pixel, a mode depth value calculated based on the pixels adjacent to the middle pixel, a median depth value calculated based on the pixels adjacent to the middle pixel such that the blurry depth value. According to another embodiment, the target recognition, analysis, and tracking system may replace the depth value of the middle pixel that may be blurry with an invalid depth value and/or may mark the middle pixel as invalid, likely blurry, potentially hazardous for segmentation and/or flood fill, or any other suitable flag, value, mark, or the like that may indicate that the middle pixel may impact one or more of the processing techniques that may be performed downstream described herein at, for example, 310.

Referring to FIG. 7, at 420, one or more pixels in the image that may be out of range may be detected to process the image at 315. For example, a capture device such as the capture device 20 described above with respect to FIGS. 1A-2 that may be included in the target recognition, analysis, and tracking system may have a limited depth range. For example, the capture device may have a maximum distance that may be captured or observed for an object in the scene and/or a minimum distance that may be captured or observed for an object in the scene. If an object may be closer to the capture device than the minimum distance or farther than the maximum distance, the pixels associated with the objects closer than the minimum distance to the capture device or farther than the maximum distance may be associated with invalid values such as invalid depth values in the image.

In an example embodiment, the target recognition, analysis, and tracking system may include an image array that may have the same number of pixels as the image. The target recognition, analysis, and tracking system may use the image array to detect whether an invalid pixel may be outside a depth range. For example, the target recognition, analysis, and tracking system may update a count associated with each pixel in the image array based on the values such as the depth values observed for the pixels in an image of each frame. According to one embodiment, for each frame, if a pixel may be invalid or may include an invalid value such as an invalid depth value, the target recognition, analysis, and tracking system may increment the count associated with the pixel in the image array. Additionally, for each frame, if a pixel may be valid or may have a valid value such as a valid depth value, the target recognition, analysis, and tracking system may reset or decrement the count associated with the pixel in the image array to zero. After updating the count in the image array, the target recognition, analysis, and tracking system may analyze the count associated with each pixel in the image array. If based on the analysis, the count may be greater than a range threshold, the target recognition, analysis, and tracking system may mark the pixel in the image as infinity or any other value that may indicate the pixel may be out of the range of the capture device.

According to one embodiment, missing portions in the image may then be filled in at 425. For example, the image that may be captured or observed may include one or more holes. The holes may include areas of the depth image where, for example, the capture device may not be able to determine a depth value or a distance to a target or object due to, for example, lighting conditions, material properties such as patterns, colors, or the like. According to an example embodiment, the target recognition, analysis, and tracking system may scan the image horizontally and/or vertically to determine a span or region of invalid depth values that may be associated with one or more holes.

Figure 9:
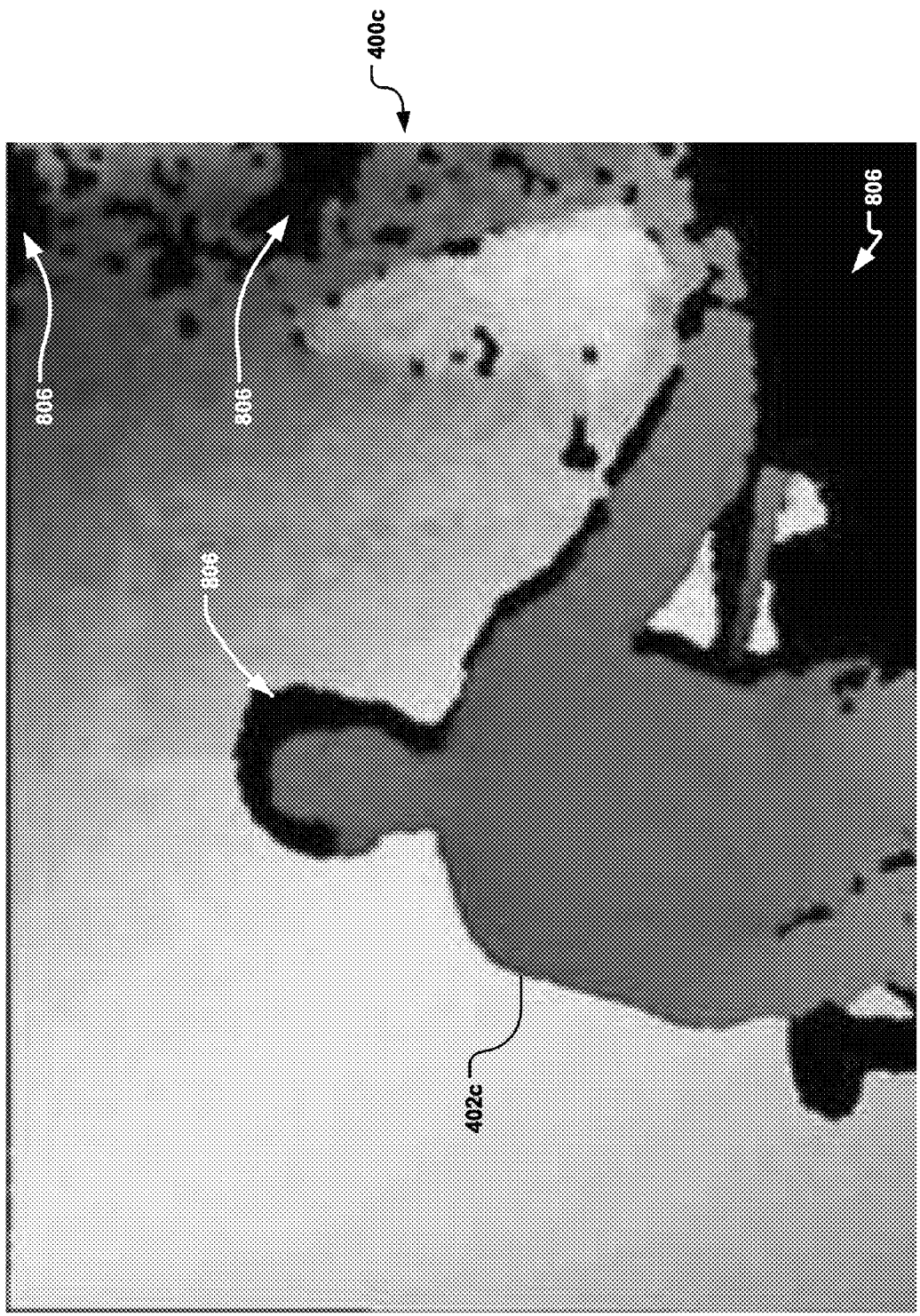
FIG. 9 illustrates an example embodiment of a depth image that may include one or more missing portions or holes.

FIG. 9 illustrates an example embodiment of an image such as a depth image 404c that may include one or more missing portions or holes 806. As shown in FIG. 9, portions or holes 806 may be areas of the depth image 404c that may have invalid pixels or empty pixels such as pixels without a value such as a depth value, pixels previously identified as being invalid by one or more of the processing techniques described herein at 310, or the like. As described above, in one example embodiment, the depth image such as the depth image 404c may be colorized such that different colors of the pixels of the depth image correspond to and/or visually depict different distances of a target or object such as a human target 402c from the capture device. As shown in FIG. 9, the portions or holes 806 may be colorized black to visually indicate one or more invalid or empty pixels.

Referring back to FIG. 7, if the image includes one or more missing portions or holes, the target recognition, analysis, and tracking system may estimate one or more values such as depth values for the missing portions or holes at 425. According to one embodiment, a depth value for the invalid pixels associated with a hole may be estimated using neighboring pixels or pixels surrounding the holes that may have valid depth values. For example, the target recognition, analysis, and tracking system may identify the outermost invalid pixels that may define an edge of a missing portion or hole. Upon identifying the outermost invalid pixels, the target recognition, analysis, and tracking system may determine whether one or more pixels adjacent to the outermost invalid pixels may be valid or may have a non-zero depth value. If one or more pixels adjacent to the invalid pixel may be valid, a depth value for the invalid pixels may be generated based on the valid, non-zero depth values of the adjacent pixels. For example, the invalid depth value may be assigned one or more values such as depth values of the valid pixels adjacent to the invalid pixels, an average value such as an average depth values of valid pixels adjacent to the invalid pixels, a linear interpolation of the values such as the depth values of valid pixels adjacent to invalid pixels, a curved interpolation of the values such as the depth values of valid pixels adjacent to invalid pixels, or the like such that the values for the invalid pixels in the missing portion or hole may be grown from the outside edge to the center of the missing portion or hole.

Additionally, the target recognition, analysis, and tracking system may limit the number of invalid pixels in a hole or missing portion that may be estimated or filled in. For example, the target recognition, analysis, and tracking system may generate a hole severity value that may include a ratio of the number of invalid pixels divided by the total number of pixels in the image. The target recognition, analysis, and tracking system may then use the hole severity value to limit the number of invalid pixels in a missing portion or hole for which to estimate a value such that bleeding may be reduced in the image. For example, the target recognition, analysis, and tracking system may limit a number of iterations from the outside edge to the center that may be performed to estimate values such as depth values for invalid pixels in a missing portion or hole of the image.

At 430, one or more portions of the image that may be associated with a floor, a wall, or any other planar surface may be detected. For example, the target recognition, analysis, and tracking system may determine which pixels in the image may be associated with the floor, at 430. According to example embodiments, the target recognition, analysis, and tracking system may determine pixels associated with the floor using a screen space floor detection technique, a pixel by pixel analysis, or any other suitable technique or analysis that may detect pixels associated with the floor.

For example, in one embodiment, the target recognition, analysis, and tracking system may identify a lower portion or region of the image such as the lower half of the image to determine the portions or pixels that may be associated with the floor. The target recognition, analysis, and tracking system may then analyze the values such as the depth values of the pixels in the lower portion or region of the image received at 305 and the values such as the depth values of the pixels in a lower portion or region of previously received images captured over a series of previous frames. In one embodiment, the target recognition, analysis, and tracking system may scan the lower portion or region of the image received at 305 and previously received images row by row or in screen space scanlines to fit one or more lines to the values such as the depth values. For example, the target recognition, analysis, and tracking system may scan the lower portion or region of the image received at 305 and previously received images row by row or in screen space scanlines to fit a first line and a second line to the values such as the depth values. The target recognition, analysis, and tracking system may then scan the fitted lines such as the first and second lines from the bottom of the image to the top of the image to determine if the lines may have a slope that may define an angle or have a change that may be greater than a predetermined angle threshold. When the lines may have a slope that may define an angle or have a change that may be greater than the predetermined angle threshold, the target recognition, analysis, and tracking system may stop the scan and may select the lines and pixels associated with the lines that may have an angle or a change in slope less than the threshold angle. The target recognition, analysis, and tracking system may then fit a floor plane to the lines of the pixels such that a floor in the image may be identified.

Thus, according to an example embodiment, the target recognition, analysis, and tracking system may analyze one or more angles of the lines that may be defined by the values of the pixels in the lower portion or region of an image at 430. If the angles may be substantially horizontal such that the angles may be within a range of, for example, 0-10 degrees, 0-15 degrees, 0-20 degrees, or the like, the target recognition, analysis, and tracking system may identify the lines of the pixels associated with such angles as part of the floor. For example, if the slopes of the lines such as the first and second lines are within a slope threshold or a predefined range, the target recognition, analysis, and tracking system may average the slopes of the first and second lines. The target recognition, analysis, and tracking system may then determine whether the averaged slopes may be within a range of a tilt of the capture device such that the pixels associated with the first and second lines may not be identified as part of the floor when the averaged slopes may be outside the range of the tilt.

The target recognition, analysis, and tracking system may further determine which pixels in the image may be associated with the wall or other planar surfaces, at 430. According to example embodiments, the target recognition, analysis, and tracking system may determine pixels associated with the wall or other planar surfaces using a screen space detection technique, a pixel by pixel analysis, or any other suitable technique or analysis that may detect pixels associated with the wall or other planar surfaces.

In an example embodiment, at 435, a determination may be made regarding whether the image may include a target. For example, at 435, the target recognition, analysis, and tracking system may determine whether the image includes a target such as a human target such as the human target 402*a-c* described with respect to FIGS. 6 and 8-9, a couch, a table, a chair, or any other object that the target recognition, analysis, and tracking system may track. To determine whether the image includes a target, according to one embodiment, the target recognition, analysis, and tracking system may flood fill each object in the image. The target recognition, analysis, and tracking system may then compare each flood-filled object to a pattern to determine whether the image includes the target.

According to one embodiment, to flood fill, predetermined points or areas on the image may be selected to determine whether the image includes a particular target. For example, various values such as depth values of pixels in a selected area or point of the image may be compared to determine edges that may define targets or objects. According to an example embodiment, the edges may be determined by comparing various depth values associated with, for example, adjacent or nearby pixels in the image. If the various depth values being compared may be greater than a predetermined edge tolerance, the pixels may define an edge. In one embodiment, the predetermined edge tolerance may be, for example, a 100 millimeters. If a pixel representing a depth value of 1000 millimeters may be compared with an adjacent pixel representing a depth value of 1200 millimeters, the pixels may define an edge of a target, because the difference in the length or distance between the pixels is greater than the predetermined edge tolerance of 100 mm. The likely Z values of the Z layers may be flood filled based on the determined edges. For example, the pixels associated with the determined edges and the pixels of the area within the edges may be associated with each other to define or an object in the scene that may be compared with a pattern.

According to an example embodiment, the pattern may include one or more data structures that may have a set of variables that may collectively define dimensions of a particular target that the target recognition, analysis, and tracking system may wish to isolate or identify in the image of the scene. For example, in one embodiment, the particular target the target recognition, analysis, and tracking system may wish to isolate or identify in the image may be a human target such that the pattern may include one or more data structures that may have a set of variables that may collectively define a typical body of a human.

The values associated with the flood-filled objects may be compared with the variables in the pattern to determine whether and which of the targets may be the particular target that the target recognition, analysis, and tracking system may wish to isolate or identify. In one embodiment, each of the variables in the set may be weighted based on an importance of portions or parts of the particular target that the target recognition, analysis, and tracking system may wish to isolate or identify. For example, if the target recognition, analysis, and tracking system may wish to isolate or identify a human target, various body parts such as a head and/or shoulders in the pattern may have weight value associated therewith that may be greater than other body parts such as a leg.

Based on the comparison, the target recognition, analysis, and tracking system may compute a sum of the weight values associated with portions of the variables in pattern that may match the flood-filled object. If the sum may be greater than a matching threshold, the target recognition, analysis, and tracking system may mark or identify the object as the target such as particular target that the target recognition, analysis, and tracking system may wish to identify. For example, the target recognition, analysis, and tracking system may create a bitmask of the flood-filled target that may have a sum greater than the matching threshold.

At 440, if the image may not include a target, a new image of a scene may be received at 305. For example, if the sum may of each object identified in the image may be less than the matching threshold, the target recognition, analysis, and tracking system may provide an indication that the image may not include the target and may receive a new image at 305.

According to one embodiment, at 440, if the image may include a target, the target may be scanned at 445 such that one or more measurements of the target may be determined. For example, if the sum may be greater than the matching threshold, at 435, the target recognition, analysis, and tracking system may mark or identify the object as the target such as particular target that the target recognition, analysis, and tracking system may wish to identify. The target may then be scanned such that one or more measurements of the target may be determined at 445. For example, the target recognition, analysis, and tracking system may scan the bitmask from top to bottom and/or left to right to determine a width, a height, or the like of the target.

According to an example embodiment, the target may include a human target. The bitmask associated with the human target may be scanned for one or more body parts at 445 to provide measurements such as length, width, or the like associated with one or more body parts of a user such as the user 18 described above with respect to FIGS. 1A and 1B. To scan the bitmask of the human target for one or more body parts, the target recognition, analysis, and tracking system may determine a top of the bitmask of the human target. The target recognition, analysis, and tracking system may then associate the top of the bitmask with a location of the top of the head. After determining the top of the head, the bitmask may be scanned downward to then determine a location of a neck of the target, a location of the shoulders of the human target, or the like.

To determine the location of the neck, shoulders, or the like of the human target, a width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like.

To determine the location of the shoulders, the width of the bitmask at various locations or positions may be compared to a threshold shoulder value. For example, a distance between the two outer most Y values at the X value of the bitmask various locations or positions may be compared to the threshold shoulder value of a typical distance between, for example, shoulders of a human. In another embodiment, to determine the location of the shoulders, the bitmask may be parsed downward a certain distance from the head. For example, the top of the bitmask that may be associated with the top of the head may have an X value associated therewith. A stored value associated with the typical distance from the top of the head to the top of the shoulders of a human body may then added to the X value of the top of the head to determine the X value of the shoulders.

Additionally, according to an example embodiment, some body parts such as legs, feet, or the like may be calculated based on, for example, the location of other body parts. For example, as described above, the information such as the bits, pixels, or the like associated with the human target may be scanned to determine the locations of various body parts such as a head, a neck, shoulders, hips, or the like. Based on such locations, subsequent body parts such as legs, feet, or the like may then be calculated for the human target.

In one embodiment, upon determining the values of, for example, a part such as a body part, a data structure may be created that may include measurement values such as length, width, or the like of the parts associated with the scan of the bitmask of the target. In one embodiment, the data structure may include scan results averaged from a plurality depth images. For example, as described, the capture device such as the capture device 20 described above with respect to FIGS. 1A-2 may capture a scene in frames. Each frame may include an image. The image of each frame may be analyzed to determine whether a target such as the human target. If the image of a frame includes a target, a bitmask of the human target of the image associated with the frame may be scanned at 445. The determined value of a part such as a body part for each frame may then be averaged such that the data structure may include average measurement values such as length, width, or the like of the part such as the body parts associated with the scans of each frame.

The target may then be segmented from the image at 450. For example, the target recognition, analysis, and tracking system may segment the target from the environment including background and/or foreground objects in the image that may not be the target. To segment the target from the environment, the target recognition, analysis, and tracking system may remove or discard the pixels that may not be associated with the target in the depth image. For example, during the scan of the human target at 445, the target recognition, analysis, and tracking system may determine or identify the pixels that may be associated with the target based on the bitmask created for the flood-filled target. The target recognition, analysis, and tracking system may then determine or identify the pixels associated with the environment such as the non-target objects based on the pixels that may not be associated with the target.

Upon identifying the pixels associated with the target and the environment, the target recognition, analysis, and tracking system may build a depth history or a history map. The target recognition, analysis, and tracking system may update the depth history or history map each frame with the values associated with the environment. According to an example embodiment, the depth history or history may be updated to include a maximum value, a minimum value, a median value, an average value, a standard deviation value, or the like of the environment in the image as observed over a series of frames.

In one embodiment, the target recognition, analysis, and tracking system may then flood-fill the target and may remove or discard pixels associated with the environment to segment the target from the environment. For example, the target recognition, analysis, and tracking system may select a point associated with the location of the centroid or center of the target and/or predetermined points at locations that may surround the centroid or center. The target recognition, analysis, and tracking system may then flood-fill such points in each frame. Based on the flood-fill, the target recognition, analysis, and tracking system may create a binary mask of the target. The target recognition, analysis, and tracking system may further remove or discard the pixels associated with the environment, based on the depth history or history map, by assigning them, for example, an invalid depth value.

According to another embodiment, the target recognition, analysis, and tracking system may determine whether the target may be in motion or moving and may remove or discard pixels associated with the environment to segment the target from the environment at 450. For example, the target recognition, analysis, and tracking system may include a reference plate such as a reference image of the scene that may include, for example, non-motion information such as non-motion depth values for each pixel. According to one embodiment, the non-motion information plate may include a moving average associated with each pixel in the scene. The moving average may include, for example, an average depth value of a pixel determined over a series of previously received frames. According to one embodiment, the target recognition, analysis, and tracking system may compare values such as a depth value of each pixel in an object in the scene with the moving average of each corresponding pixel included in the reference plate. Based on the comparison, the target recognition, analysis, and tracking system may identify a pixel as moving. For example, in one embodiment, if a depth value of a pixel may be less than the moving average of the corresponding pixel in the reference plate such that the pixel may be in front of the moving average, the pixel may be identified as moving. Alternatively, if, for example, a difference between the depth value of a pixel and the moving average of the corresponding pixel in the reference plate may be greater than a motion threshold, the voxel may be identified by the target recognition, analysis, and tracking system as moving.

The target recognition, analysis, and tracking system may then calculate a foreground score for each identified object based on a percentage of moving pixels. In one embodiment, the target recognition, analysis, and tracking system may divide the number of voxels pixels in the object that may be identified as moving by the total number of pixels included in the object to calculate the foreground score. According to one embodiment, the target recognition, analysis, and tracking system may create a binary mask for the target that may have foreground score that may exceed a score threshold. Based on the depth history or history map, the target, recognition, analysis, and tracking system may further remove or discard the pixels associated with the environment by assigning them, for example, an invalid depth value such as a depth value of zero as described above.

Referring back to FIG. 5, after processing the image at 310 using, for example, the method described above with respect to FIG. 7, the target recognition, analysis, and tracking system may render a refined image at 315. According to one embodiment, the refined image may be the image with noise, missing portions, shadows removed and/or smoothed, the target isolated, the floor identified, or the like. Thus, in an example embodiment, the refined image may be the image received at 305 after the image may be processed at 310 using, at least a portion of the example method for processing described with respect to FIG. 7.

Figure 10:
FIG. 10 illustrates an example embodiment of a refined depth image that may be rendered based on processing of an image that may be captured or observed.

FIG. 10 illustrates an example embodiment of a refined image 406 that may be rendered based on processing of an image that may be captured or observed. As shown in FIG. 10, the refined 406 may be the depth image 404c shown in FIG. 9 after processing the depth image 404c using at least a portion of the example method of processing at 310 described with respect to FIG. 7.

Referring back to FIG. 5, the refined image and/or binary mask associated with the target may be processed at 320. In one embodiment, the target recognition, analysis, and tracking system may process the refined image and/or the binary mask associated with the target at 330 such that a model such as a skeletal model, a mesh model, or the like of the target in the may be generated. According to an example embodiment, the model may be tracked, an avatar associated with the model may be rendered, and/or one or more applications executing on a computer environment may be controlled.

It should be understood that the configurations and/or approaches described herein are exemplary in nature, and that these specific embodiments or examples are not to be considered limiting. Additionally, the methods or processes described herein may represent one or more of any number of processing strategies. As such, the methods or processes describe herein may be performed in the sequence of the steps illustrated, in other sequences, in parallel, or the like. Likewise, the order of the steps illustrated of the above-described methods or processes described may be changed and/or performed in any suitable order.

The subject matter of the present disclosure includes all novel and nonobvious combinations and subcombinations of the various methods, processes, systems and configurations, and other features, functions, acts, and/or properties disclosed herein, as well as any and all equivalents thereof.

What is claimed:

1. A method for processing an image of a scene, the method comprising:
   receiving the image;
   processing the image to determine one or more characteristics of the scene, wherein processing the image to determine the one or more characteristics of the scene comprises:
      determining that the image includes a shadow by:
         calculating a number of pixels associated with a group of pixels determined to be invalid; and
         matching the number of pixels associated with the group of pixels determined to be invalid to a stored number of invalid pixels determined to indicate the shadow; and
      estimating one or more values for the pixels associated with the group of pixels determined to be invalid; and
      detecting a portion of the image associated with a floor by at least:
         scanning at least a portion of the image to fit a plurality of lines to depth values;
         starting with a line of the plurality of lines closest to a bottom of the image and then moving upwards, determining whether each line has a slope that defines an angle or change that is greater than a threshold until one of the lines is determined to have a slope that defines an angle or change that is greater than the threshold; and
         determining that the portion of the image associated with the floor corresponds to each line determined to have a slope that defines an angle or change not greater than the threshold; and
   rendering a refined image based on the one or more characteristics of the scene.

2. The method of claim 1, wherein processing the image to determine the one or more characteristics of the scene further comprises downsampling the image.

3. The method of claim 1, wherein processing the image to determine the one or more characteristics of the scene further comprises determining whether the image includes noise; and removing the noise in the image.

4. The method of claim 1, wherein processing the image to determine the one or more characteristics of the scene further comprises detecting whether one or more pixels in the image may be outside a range defined by a capture device, wherein the capture device captures the image.

5. The method of claim 1, wherein processing the image to determine the one or more characteristics of the scene further comprises:
  determining whether the image includes a target; and
  scanning the target if, based on the determination, the image includes the target.

6. The method of claim 5, wherein processing the image to determine the one or more characteristics of the target comprises segmenting the target from the image.

7. A computer-readable storage memory having stored thereon computer executable instructions for processing an image, the computer executable instructions comprising instructions for:
  receiving the image, wherein the image comprises a plurality of pixels;
  processing the image, wherein processing the image comprises:
    determining that the image includes a shadow by:
      calculating a number of pixels associated with a group of pixels determined to be invalid; and
      matching the number of pixels associated with the group of pixels determined to be invalid to a stored number of invalid pixels determined to indicate the shadow; and
    estimating one or more values for the pixels associated with the group of pixels determined to be invalid; and
    detecting a portion of the image associated with a floor by at least:
      scanning at least a portion of the image to fit a plurality of lines to depth values;
      starting with a line of the plurality of lines closest to a bottom of the image and then moving upwards, determining whether each line has a slope that defines an angle or change that is greater than a threshold until one of the lines is determined to have a slope that defines an angle or change that is greater than the threshold; and
      determining that the portion of the image associated with the floor corresponds to each line determined to have a slope that defines an angle or change not greater than the threshold; and
  rendering a refined image based on the processed image.

8. The computer-readable storage memory of claim 7, wherein the instructions for processing the image further comprises instructions for detecting whether one or more pixels in the image are outside a range defined by a capture device associated with the image.

9. The computer-readable storage memory of claim 8, wherein the instructions for determining whether one or more pixels are outside the range defined by the capture device associated with the image comprises instructions for providing an image array, wherein the image array has a number of pixels equal to a total number of pixels in the image; incrementing a count associated with the pixels in the image array if a value associated with the corresponding pixels in the image is invalid; analyzing the count associated with the pixels in the image array; and marking the pixels in the image with an infinity value if the count associated with the corresponding pixels in the image array is greater than a range threshold.

10. The computer-readable storage memory of claim 7, wherein the instructions for processing the image further comprises instructions for:
  determining that the image includes a target;
  scanning the target; and
  segmenting the target from the image.

11. The computer-readable storage memory of claim 10, wherein the instructions for segmenting the target from the image comprises instructions for creating a binary mask of the target; and discarding an environment included in the image.

12. The computer-readable storage memory of claim 10, wherein the instructions for scanning the target comprises instructions for determining one or more measurements of the target.

13. The computer-readable storage memory of claim 7, wherein the instructions for processing the image further comprise instructions for downsampling the image by reducing a number of the plurality of pixels and filtering one or more invalid pixels in the plurality of pixels.

14. A system for processing an image of a scene, the system comprising:
  a capture device, wherein the capture device comprises a camera component operable to receive the image of the scene, wherein the image comprises pixels;
  memory having stored therein computer-executable instructions;
  a processor in operative communication with the capture device and operable to execute the computer-executable instructions, wherein the computer-executable instructions comprise instructions for performing operations comprising:
    processing the image, wherein processing the image comprises:
      determining that the image includes a shadow by:
        calculating a number of pixels associated with a group of pixels determined to be invalid; and
        matching the number of pixels associated with the group of pixels determined to be invalid to a stored number of invalid pixels determined to indicate the shadow; and
      estimating one or more values for the pixels associated with the group of pixels determined to be invalid; and
      detecting a portion of the image associated with a floor by at least:
        scanning at least a portion of the image to fit a plurality of lines to depth values;
        starting with a line of the plurality of lines closest to a bottom of the image and then moving upwards, determining whether each line has a slope that defines an angle or change that is greater than a threshold until one of the lines is determined to have a slope that defines an angle or change that is greater than the threshold; and
        determining that the portion of the image associated with the floor corresponds to each line determined to have a slope that defines an angle or change not greater than the threshold; and
    rendering a refined image based on the processed image.

* * * * *